US008253628B2

(12) United States Patent
Duffett-Smith et al.

(10) Patent No.: US 8,253,628 B2
(45) Date of Patent: *Aug. 28, 2012

(54) TRANSFER OF CALIBRATED TIME INFORMATION IN A MOBILE TERMINAL

(75) Inventors: Peter James Duffett-Smith, Cambridge (GB); Anthony Richard Pratt, Cambridge (GB); David William Bartlett, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/951,856

(22) Filed: Nov. 22, 2010

(65) Prior Publication Data
US 2011/0187595 A1 Aug. 4, 2011

Related U.S. Application Data

(63) Continuation of application No. 11/492,200, filed on Jul. 25, 2006, now Pat. No. 7,852,267, which is a continuation-in-part of application No. PCT/EP2005/050255, filed on Jan. 21, 2005.

(60) Provisional application No. 60/591,923, filed on Jul. 29, 2004.

(30) Foreign Application Priority Data

Jan. 26, 2004 (EP) .................................... 04250403
Jun. 9, 2004 (EP) .................................... 04253427
Sep. 24, 2004 (GB) .................................... 0421351.8

(51) Int. Cl.
*G01S 3/02* (2006.01)

(52) U.S. Cl. ....................................................... 342/464

(58) Field of Classification Search .. 342/357.2–357.78, 342/463–464
See application file for complete search history.

(56) References Cited

U.S. PATENT DOCUMENTS

| 5,663,735 A | 9/1997 | Eshenbach ..................... 342/357 |
| 5,838,279 A | 11/1998 | Duffett-Smith et al. ...... 342/459 |

(Continued)

FOREIGN PATENT DOCUMENTS
EP  0 303 371  2/1989
(Continued)

*Primary Examiner* — Gregory C Issing
*Assistant Examiner* — Nga X Nguyen
(74) *Attorney, Agent, or Firm* — Roylance, Abrams, Berdo & Goomdan, LLP

(57) ABSTRACT

A method of and system for calibrating un-calibrated time information within a mobile terminal 101 is disclosed. The terminal has a receiver 203 capable of receiving signals from which calibrated time information carried by a calibrated system (a satellite positioning system) can be extracted, and a receiver 200 capable of receiving signals from which un-calibrated time information carried by an un-calibrated stable system (a cellular communications system) may be extracted. The time offset between calibrated time information extracted from the calibrated system and un-calibrated time information extracted from the un-calibrated stable system is determined at a first terminal position where the signals from the un-calibrated stable system are available, the travel times of the signals from the un-calibrated stable system are known or determined, and the signals from the calibrated system are available. The un-calibrated time information extracted from signals of the un-calibrated stable system received at a second terminal position, is calibrated from known or determined travel times of the signals from the un-calibrated stable system at the second terminal position and the time offset which has been determined.

22 Claims, 9 Drawing Sheets

U.S. PATENT DOCUMENTS

| | | | |
|---|---|---|---|
| 5,982,324 A | 11/1999 | Watters et al. | |
| 6,094,168 A | 7/2000 | Duffett-Smith et al. | 342/463 |
| 6,275,705 B1 | 8/2001 | Drane et al. | 455/456 |
| 6,342,854 B1 | 1/2002 | Duffett-Smith et al. | 342/457 |
| 6,429,815 B1 | 8/2002 | Soliman | 342/357.15 |
| 6,445,927 B1 | 9/2002 | King et al. | 455/456 |
| 6,522,890 B2 | 2/2003 | Drane et al. | 455/456 |
| 6,529,165 B1 | 3/2003 | Duffett-Smith et al. | 342/463 |
| 6,603,978 B1 | 8/2003 | Carlsson et al. | 455/502 |
| 6,894,644 B2 | 5/2005 | Duffett-Smith et al. | 342/387 |
| 6,937,866 B2 | 8/2005 | Duffett-Smith et al. | 455/456.1 |
| 7,139,580 B2 | 11/2006 | Stein et al. | |
| 7,363,043 B2 | 4/2008 | Jaeckle et al. | |
| 7,852,267 B2 * | 12/2010 | Duffett-Smith et al. | 342/463 |
| 2002/0068997 A1 | 6/2002 | Agashe et al. | 701/4 |
| 2002/0075942 A1 | 6/2002 | Patrick | 375/142 |
| 2002/0123352 A1 | 9/2002 | Vayanos et al. | 455/456 |
| 2002/0168988 A1 | 11/2002 | Younis | 455/456 |
| 2003/0040869 A1 | 2/2003 | Nir et al. | |
| 2003/0119496 A1 * | 6/2003 | Gaal et al. | 455/424 |
| 2004/0080454 A1 | 4/2004 | Camp, Jr. | |
| 2008/0169979 A1 * | 7/2008 | de Salas | 342/357.12 |

FOREIGN PATENT DOCUMENTS

| | | |
|---|---|---|
| EP | 1 229 409 | 8/2002 |
| WO | 97/11384 | 3/1997 |
| WO | 97/23047 | 6/1997 |
| WO | 99/21028 | 4/1999 |
| WO | 99/47943 | 9/1999 |
| WO | 00/73813 | 12/2000 |
| WO | 00/73814 | 12/2000 |
| WO | 01/33302 | 5/2001 |
| WO | 01/76285 | 10/2001 |
| WO | 02/091630 | 11/2002 |

* cited by examiner

TRANSFER OF CALIBRATED TIME INFORMATION IN A MOBILE TERMINAL

This application is a continuation of U.S. application Ser. No. 11/492,200, filed Jul. 25, 2006 now U.S. Pat. No. 7,852,267, which is a continuation-in-part of International Patent Application No. PCT/EP05/50255, filed in English on Jan. 21, 2005 and designating the United States, the entire disclosures of which are hereby incorporated by reference. International Patent Application No. PCT/EP05/50255 claims priority under 35 USC 119 (a) from European Patent Application No. 04250403.5, filed on Jan. 26, 2004, from European Patent Application No. 04253427.1, filed on Jun. 9, 2004, and from United Kingdom Patent Application No. 0421351.8, filed on Sep. 24, 2004, the entire disclosures of all of said applications being hereby incorporated by reference. International Patent Application No. PCT/EP05/50255 also claims priority under 35 USC 119 (e) from U.S. Provisional Patent Application Ser. No. 60/591,923, filed on Jul. 29, 2004, the entire disclosure of which is hereby incorporated by reference.

FIELD OF TECHNOLOGY

The present invention relates to systems in which it is required to provide accurate time information in situations where a primary calibrated clock is unavailable, but where a secondary clock, which has previously been calibrated from the primary clock, can be used.

More specifically, the invention relates to the transfer of time information within mobile terminals using positioning systems based on signals received from transmission sources. Of particular interest is a mobile terminal using radio signals received from both a satellite positioning system (such as the Global Positioning System, GPS) and a terrestrial radio network.

BACKGROUND

Technology for positioning mobile radio terminals using the signals received from one or more transmitters has been widely used for many years. Such systems include terrestrial networks of transmitters (e.g. Loran) and networks of satellites (e.g. GPS and Gallileo) deployed specifically for the purpose of locating the receiver, as well as methods that use general-purpose radio networks such as cellular mobile telephone networks (e.g. WO-A-97-11384) or TV and radio transmitter networks. (e.g. EP-A-0303371).

Within a cellular mobile telephone network, for example, the position of the terminal may be based on the identity of the serving cell, augmented by information such as the time delay between the serving transmitter and terminal, the strengths of signals received from the serving and neighbouring transmitters, or angles of incidence of received signals. An improved position may be obtained using the observed time difference of arrival (OTDA) of signals received at the terminal from two or more transmission sources.

OTDA methods give good position accuracy using only the signals available within the cellular radio network. However, they require the precise transmission time offsets between transmitters to be determined in order to solve the positioning equations. This can be done using location measuring units (LMUs) having additional receivers. LMUs are placed at known locations so that their OTDA measurements can be converted directly into a network timing model (see for example WO-A-00-73813).

Alternatively a technique (see WO-A-00-73814) may be used in which measurements of signals from a number of geographically disparate transmitters at known positions made, for example, by two geographically disparate terminals at unknown positions, may be used to compute both the positions of the terminals and all the timing offsets between the measured transmitters, without the need for LMUs.

Satellite positioning systems, such as GPS, provide an accurate solution provided that the receiver can receive sufficient satellite signals. The satellite signals are related to a common time-base of a globally defined standard time, e.g. GPS Time or Universal Coordinated Time, UTC. For example, within GPS, each satellite in the constellation has a stable atomic clock whose time is continuously measured and compared with a single reference clock located on the ground. The time of each satellite clock is steered towards alignment with the reference clock and a three-parameter model derived which describes the difference in time between the two clocks. The three parameters are up-loaded to the satellite and broadcast by the satellite as the clock correction parameters. This has the effect, after making corrections based on the parameters, of aligning the satellite clock closely with the ground-based reference clock. Satellite positioning systems work well in situations where the receiver's antenna has clear sight of the sky, but they work poorly, or not at all, inside buildings or when the view of the sky is obscured. Another problem is that they take a long time to achieve a "first fix" from a cold start and they therefore work best when they are tracking the satellite signals continuously.

PRIOR ART

In attempts to overcome these problems various proposals have been made to provide 'assistance' to satellite positioning systems. For example, U.S. Pat. No. 5,663,735 discloses providing an additional radio signal to an additional receiver in a GPS terminal, the radio signal having a standard time or frequency and using the standard time or frequency to resolve a GPS time for a time of arrival of a data bit. In another example, (see WO-A-99-47943) a mobile cellular telephone network is adapted to receive GPS signals at a base transmitter station (BTS) to allow it to calculate the position of a mobile telephone.

In a further development (see US-A-2002-0168988) a GPS unit has a position determining system (PDE) which includes a reference signal receiver, typically part of a mobile communications system, and part of a reference signal received by the reference signal receiver is transmitted to the PDE to provide additional timing data which can be used to assist the GPS unit operation.

The sending of assistance data over a link has been known in the art for many years. One of the earliest examples was provided in 1986. White Sands Missile Range Interface Control Document disclosed position reporting over a two-way communications link which allowed for the transfer of either pseudo-range or computed location based on a geodetic coordinate reference frame as defined, from time to time, in WGS84 format. ICD GPS 150, dated 1986 and issued by the US government to potential bidders for the range applications joint programme, incorporated, inter alia, support for mobile GPS receivers through transmission of ephemerides, almanac and time information. Actual use of these data formats in support of mobile GPS receivers by means of two-way data-links has been made since 1986.

Providing a satellite positioning system receiver with assistance data can enhance its performance. Furthermore, accurate timing assistance reduces the complexity of the associated chip sets. Assistance data may comprise all or some of three elements: a) satellite information, b) time aiding, and c) an estimate of the receiver's position.

Known in the art are methods by which the satellite information is provided by a server which is linked to one or more reference receivers that continually monitor the satellite signals in order to obtain the satellite information. In a GPS system, this information can also be obtained directly by the GPS receiver from the satellite signals whenever a satellite signal can be received. Time aiding may be obtained from network signals whose timings have previously been related to the satellite time base by network-based equipment. An estimate of a receiver's position may be obtained using a network positioning method, such as one based on OTDA. In all cases in the art, the assistance data is sent to the GPS receiver using a data channel provided by the mobile cellular network.

In our WO-A-00-73813 and WO-A-00-73814, the entire disclosures of which are hereby incorporated by reference, we describe a communications system and method which constructs and maintains a timing model defining the timing relationships between transmitters in the cellular radio network. The system also computes the position of the receiver. By linking the timing of the signals from one or more transmitters of such a system to the GPS time base, this network timing model could be used to infer the timing of the signals transmitted by any transmitter in the network relative to the GPS time base and thereby provide timing assistance information to a GPS receiver. The position estimate may also be provided to the GPS receiver.

Other references describing assistance systems include U.S. Pat. No. 6,429,815, US-A-2002-0075942, US-A-2002-0068997, US-A-2002-0123352, WO-A-02-091630 and WO-A-01-33302.

In U.S. Pat. No. 6,445,927 (King et al.) there is described a method for computing the location of a base-station in a communications network, using measurements made by a mobile terminal of the time of arrival of communication signals from the base station with respect to GPS position information obtained from a GPS set carried within the terminal. A critical feature is that the terminal must be located in a minimum of three geographically disjoint locations before a solution can be found. The current invention is not concerned with location of the base station as that is information which is provided within the method.

In U.S. Pat. No. 6,603,978 (Carlsson et al.) there is provided a method and apparatus for providing time information assistance to a GPS receiver located in a mobile terminal via a wireless communication signal during active call sessions where the traffic and control channels are not necessarily synchronised. Unlike the current invention, this is achieved using location measurement units (LMUs) and GPS receivers associated with the base stations in the network, and time offsets are sent over the communications channel to the mobile terminal.

In a patent application published under US 2002/0168988 A1 (Younis), timing assistance is provided to a GPS set in a mobile terminal by using a reference signal (for example a public broadcast signal) which is received both in the terminal and in one or more receivers in the network. The terminal sends a snippet of the received reference signal to a network-based computing node, along with a request for GPS aiding information, where the time offset with respect to the reference signal is determined. This time offset is sent back to the terminal which uses the information to acquire GPS signals. As previously noted, the current invention does not compute any GPS time offsets in the network, and neither does it transmit such information over a communications link. Furthermore, the current invention does not transmit snippets of reference signals over a communications link.

In summary, therefore, it is known that current systems for locating a mobile receiver using satellite positioning technology can be improved if they are supplied with accurate time aiding based on the timing of another signal, such as the signal received from the serving base station (the 'downlink') of a cellular mobile radio network. The time aiding is used by a satellite positioning receiver to reduce the range of time offsets over which it must search in order to detect a given satellite signal. The generation of accurate time aiding requires the time relationship between the satellite signals of the satellite positioning system (the satellite time base) and the downlink signals of the cellular network to be known. The timings can be measured and linked together using either LMUs installed at fixed known locations, or a network-based system such as described in our WO-A-00-73813 and WO-A-00-73814. One or more GPS LMUs in the network can then be used to find the offsets between the network timings and the GPS time base. In such cases, time aiding is therefore only available when the mobile terminal has access to a properly equipped terrestrial radio network. Furthermore a significant amount of signalling and messaging is required both within the network, and between the network and the mobile terminal.

Calibrated time information, i.e. time information related accurately to a reference time such as GPS Time or UTC, can be used for many purposes. One of these, mentioned above, is to assist a GPS or other satellite positioning receiver to lock on to the signals from a particular satellite by reducing the uncertainty of the times of arrival of the signals, and hence reducing the range of time offsets over which the receiver must search in order to detect the signals. Another use of calibrated time information is in Very Long Baseline Interferometry where two radio astronomy receivers at either ends of the baseline (which may be thousands of km in length) must be synchronised with each other to within a time precision equal to the reciprocal of the receiver bandwidth (i.e. about 200 ns for a 5 MHz bandwidth).

The present invention removes the need for network-based equipment generating time-aiding information and the signalling/messaging required to support it as identified in the prior art. The improvement in the elimination of time assistance signalling increases the capacity for radio traffic, and renders a robust timing assistance capability. We show how functions may be incorporated within the mobile terminal that allow it to determine the relationship between the satellite time base and the network timings autonomously. In particular, it should be noted that two-way communication between the terminal and the network is not a required feature. A system set up according to the invention may operate using only the broadcast signals from the network without the need for the terminal to register with the network or to send any messages.

SUMMARY OF THE INVENTION

In accordance with an exemplary embodiment of the present invention, a method is provided for calibrating uncalibrated time information within a mobile terminal. The mobile terminal has one or more receivers, that is, a first receiver capable of receiving signals from which calibrated time information carried by a calibrated system can be extracted, and the or another receiver. Said receiver is capable of receiving signals from multiple transmitters of an uncalibrated stable communications system, said transmitters having offsets in their signal transmission times, from which signals un-calibrated time information carried by an un-calibrated stable communication system may be extracted together with the transmission time offsets. The method comprises the steps of determining said transmission time offsets;

at a first terminal position where the signals from the transmitters of said un-calibrated stable communications system are available and the signals from the calibrated system are available, determining, within the terminal, first travel times of the signals from the transmitters of said un-calibrated stable communications system and the time offset between said calibrated time information extracted from the calibrated system and said un-calibrated time information extracted from the un-calibrated stable communications system; and at a second terminal position, where calibrated time information is not available, determining, within the terminal, second travel times of the signals from the transmitters of said un-calibrated stable communications system, and calibrating said un-calibrated time information, extracted from signals of the un-calibrated stable communications system using said first and second travel times, said transmission time offsets, and said time offset determined at the first terminal position.

In accordance with another exemplary embodiment of the present invention, a method is provided for calibrating un-calibrated time information within a mobile terminal. The mobile terminal has one or more receivers, where a first receiver is capable of receiving signals from which calibrated time information carried by a calibrated system can be extracted, and the or another receiver. Said receiver is capable of receiving signals from multiple transmitters of each of first and second un-calibrated stable communications systems, said respective transmitters having offsets in their signal transmission times, from which signals the un-calibrated time information carried by each of said first and second un-calibrated stable communications systems may be extracted together with the respective transmission time offsets. The method comprises the steps of determining said respective transmission time offsets;

at a first terminal position where the signals from the transmitters of said first un-calibrated stable communications system are available and the signals from the calibrated system are available, determining, within the terminal, first travel times of the signals from the transmitter of said first un-calibrated stable communications system and a first time offset between said calibrated time information extracted from the calibrated system and uncalibrated time information extracted from the first un-calibrated stable communications system;

at a second terminal position where the signals from the first and second un-calibrated stable communications systems are available, determining, within the terminal, second travel times of the signals from the transmitters of said first un-calibrated stable communications system, third travel times of the signals from the transmitters of said second un-calibrated stable communications system, and a second time offset between said un-calibrated time information extracted from the first un-calibrated stable communications system and said un-calibrated time information extracted from the second un-calibrated stable communications system; and at a third terminal position, where calibrated time information from the calibrated system is not available, determining, within the terminal, fourth travel times of the signals from the transmitters of said second un-calibrated stable communications system, and calibrating said un-calibrated time information, extracted from signals of the second un-calibrated stable system using said first, second, third and fourth travel times, said respective transmission time offsets, and said first and second determined time offsets.

In accordance with yet another exemplary embodiment of the present invention, a mobile terminal of a satellite positioning system is provided. The terminal includes means for determining the travel times of the signals from transmitter of an un-calibrated stable communications system to the terminal, said transmitters having offsets in their signal transmission times;

means for determining said transmission time offsets;

time offset determination means for determining the time offset between calibrated time information extracted from the satellite positioning system and un-calibrated time information extracted from the un-calibrated stable communications system at a first terminal position where the signals from the transmitters of said un-calibrated stable communications system are available, and the signals from the satellite positioning system are available; and calibration means for calibrating un-calibrated time information, extracted from signals of the un-calibrated stable communications system received at a second terminal position, from the travel times of the signals from the transmitters of said un-calibrated stable communications system determined at the first and second terminal positions, said transmission time offsets, and said time offset determined at the first terminal position.

In accordance with still yet another exemplary embodiment of the present invention, a mobile terminal of a satellite positioning system is provided. The terminal includes means for determining the travel times of the signals from transmitters of first and second un-calibrated stable communications systems to the terminal, said transmitters of each of said un-calibrated stable communications systems having offsets in their signal transmission times;

means for determining said transmission time offsets;

time offset determination means for determining, at a first terminal position where the signals from the first un-calibrated stable communications system are available and the signals from the satellite positioning system are available, the time offset between calibrated time information extracted from the satellite positioning system and un-calibrated time information extracted from the first un-calibrated stable communications system; and time offset determination means for determining, at a second terminal position where the signals from the first and second un-calibrated stable communications systems are available, a second time offset between un-calibrated time information extracted from the first un-calibrated stable communications system and un-calibrated time information extracted from the second un-calibrated stable communications system; and calibration means for calibrating un-calibrated time information, extracted from signals of the second un-calibrated stable communications system, received at a third terminal position, from the travel times of the signals from the un-calibrated stable communications systems received at the first, second and third terminal positions, said transmission time offsets, and said first and second determined time offsets.

BRIEF DESCRIPTION OF THE DRAWINGS

The invention and several examples of the system in which it may be deployed will now be further described with reference to the accompanying drawings, in which.

DETAILED DESCRIPTION OF THE EXEMPLARY EMBODIMENTS

Figure 1:
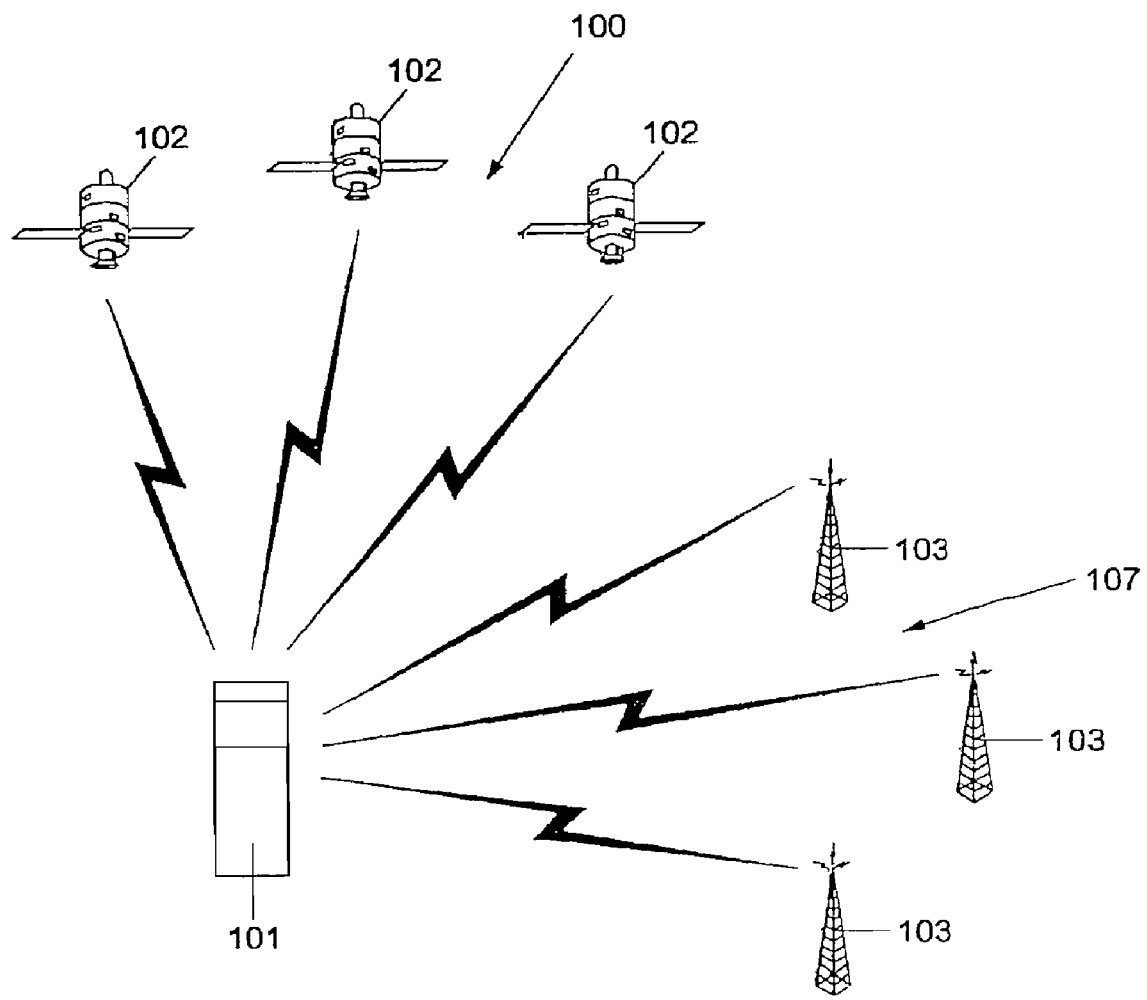
FIG. 1 is a diagram illustrating the overall architecture of a satellite positioning system in which the invention is deployed.

According to a first aspect of the invention, there is provided a method of calibrating un-calibrated time information within a mobile terminal having one or more receivers capable of receiving signals from which calibrated time information carried by a calibrated system can be extracted, and capable of receiving signals from which un-calibrated time information carried by an un-calibrated stable system may be extracted, the method comprising the steps of at a first terminal position where the signals from the un-calibrated stable system are available and the signals from the calibrated system are available, determining, within the terminal, first travel times of the signals from the un-calibrated stable system and the time offset between calibrated time information extracted from the calibrated system and un-calibrated time information extracted from the un-calibrated stable system; and at a second terminal position where calibrated time information is not available, determining, within the terminal, second travel times of the signals from the un-calibrated stable system, and calibrating un-calibrated time information extracted from signals of the un-calibrated stable system, using said first and second travel times and the time offset determined at the first terminal position.

The invention also includes a system for calibrating un-calibrated time information within a mobile terminal having one or more receivers capable of receiving signals from which calibrated time information carried by a calibrated system can be extracted, and capable of receiving signals from which un-calibrated time information carried by an un-calibrated stable system may be extracted, the system comprising means for determining the travel times of the signals from the un-calibrated stable system to the terminal;

time offset determination means for determining, within the terminal, the time offset between calibrated time information extracted from the calibrated system and un-calibrated time information extracted from the un-calibrated stable system at a first terminal position where the signals from the un-calibrated stable system are available and the signals from the calibrated system are available; and calibration means for calibrating un-calibrated time information, extracted from signals of the un-calibrated stable system at a second terminal position, using travel times of the signals from the un-calibrated stable system determined at the first and second terminal positions and the time offset determined at the first position.

The invention therefore enables the transfer of calibrated time information within a terminal as the terminal moves from one position to another, for example for aiding a satellite-based position determining system.

The time information transfer can be used for any purpose where calibrated time information is required, but where a primary calibrated time reference is not available. For example, the calibrated system can be the time base of a satellite positioning system such as GPS, and the signals received by a receiver from the satellites can be used to determine a calibrated time, such as UTC. Alternatively, the calibrated system could be a local time reference, for example a quartz-based or atomic clock. The un-calibrated stable system can be any system or device which can provide time information which remains valid (stable) over a long-enough period. For example, the signals transmitted by one or more transmitters of a communications network may be used for this purpose, since the signals are usually derived from high-quality oscillators exhibiting excellent coherence properties, which themselves are often locked to a common reference signal disseminated from a central point in the network. At a particular instance, accurate time information may be required where the satellite signals are blocked, distorted, or otherwise unavailable, but where the network signals can still be received.

The mobile terminal can act autonomously without assistance sent from the network, i.e.

without the need either for additional infrastructure located in the terrestrial network or for the communications and signalling overhead typically required to convey time information to the mobile terminal.

Alternatively, the mobile terminal can be assisted by a server connected to the terminal via a communications link. As discussed later, the server can carry out the computations necessary for the extraction of the un-calibrated time information from the un-calibrated stable system. It should be noted that, in this case, the messages carried across the link convey no calibrated time information, in particular nothing from which a universal time, such as a satellite time-base time or UTC, may be extracted, in distinction with the prior art.

The travel times of the signals received at the first and second terminal positions from the un-calibrated stable system can be determined when the positions of both the transmitters and the terminal are known. The transmitter positions can be obtained from a database, or decoded from one or more of the signals from the un-calibrated stable system, or they may be obtained from signals from another transmitter. The position of the terminal at both the first and second terminal positions can be obtained by any convenient means, for example by using one of the positioning systems described above.

The round-trip travel times of the signals from the serving transmitter are usually known approximately within a terminal of a communications network since the terminal must advance its internal timings by this amount in order that the serving base station receives signals back from the terminal which are synchronous with those it sent. In some systems, the amount by which the terminal must advance its timings is called the Timing Advance (TA) value. In the case where the un-calibrated stable system is the serving transmitter, therefore, it may not be necessary to know the position of the terminal to carry out the calibration of the un-calibrated time information.

The determination of time offsets is well known in the art and may be carried out by any convenient means. For example, the time elapsed between the arrival of specific time markers within the signals from the calibrated and un-calibrated systems may be measured on a clock within the terminal, and then a correction applied for the transmission delay between transmitter and terminal as described above.

In some cases, it is an advantage to be able to pass the calibrated time offset from one un-calibrated stable system to another. This may be the case, for example, when the signals from a first network transmitter, used as a first un-calibrated stable system, are unavailable, but the signals from a second network transmitter can be received.

According to a second aspect of the invention, there is provided a method of calibrating un-calibrated time information within a mobile terminal having one or more receivers capable of receiving signals from which calibrated time information carried by a calibrated system can be extracted, and capable of receiving signals from which un-calibrated time information carried by first and second un-calibrated stable systems may be extracted, the method comprising the steps of at a first terminal position where the signals from the first un-calibrated stable system are available and the signals from the calibrated system are available, determining, within the terminal, first travel times of the signals from the first un-calibrated stable system and a first time offset between calibrated time information extracted from the calibrated system and un-calibrated time information extracted from the first un-calibrated stable system;

at a second terminal position where the signals from the first and second un-calibrated stable systems are available, determining, within the terminal, second travel times of the signals from the first un-calibrated stable system, third travel times of the signals from the second un-calibrated stable system, and a second time offset between un-calibrated time information extracted from the first un-calibrated stable system and un-calibrated time information extracted from the second un-calibrated stable system; and at a third terminal position, where calibrated time information from the calibrated system is not available, determining, within the terminal, fourth travel times of the signals from the second un-calibrated stable system, and calibrating un-calibrated time information, extracted from signals of the second un-calibrated stable system using said first, second, third and fourth travel times and said first and second determined time offsets.

The invention further includes a system for calibrating un-calibrated time information within a mobile terminal having one or more receivers capable of receiving signals from which calibrated time information carried by a calibrated system can be extracted, and capable of receiving signals from which un-calibrated time information carried by first and second un-calibrated stable systems may be extracted, the system comprising means for determining the travel times of the signals from the un-calibrated stable systems to the terminal;

time offset determination means for determining, within the terminal, a first time offset between calibrated time information extracted from the calibrated system and un-calibrated time information extracted from the first un-calibrated stable system at a first terminal position where the signals from the first un-calibrated stable system are available and the signals from the calibrated system are available;

time offset determination means for determining, within the terminal, a second time offset between un-calibrated time information extracted from the first un-calibrated stable system and un-calibrated time information extracted from the second un-calibrated stable system where the signals from the first and second un-calibrated stable systems are available; and calibration means for calibrating un-calibrated time information, extracted from signals of the second un-calibrated stable system at a third terminal position, using the travel times of the signals from the un-calibrated stable systems determined at the first, second and third terminal positions, and said first and second determined time offsets.

In both aspects of the invention, different receivers may be used in some cases for receipt of the signals from the calibrated and un-calibrated systems. In other cases, an integrated multi-purpose receiver may be used. Similarly, the receivers for receiving the signals from the two un-calibrated stable systems can be the same or they can be different receivers. For example, the first un-calibrated stable system could be provided by one or more transmitters of a GSM mobile communications network, requiring a first receiver, and the second un-calibrated stable system could be provided by one or more transmitters of a different network such as a wide-band CDMA or other system, requiring a second receiver. In the case where network elements of the same type are used for the two un-calibrated stable systems, for example two GSM transmitters, so that the same receiver can be used for each of them, the transmitters themselves may nevertheless be parts of two different networks (for example, competing carriers), or the same network working in different frequency bands (for example, at 900 MHz and 1800 MHz in the case of European dual-band GSM networks).

In the case where the first un-calibrated system is the serving transmitter of a terminal in a communications network, the timing advance (TA) or round trip travel time (RTTT) may be known. It may not be necessary therefore to know the position of the terminal in order to measure the first time offset between the calibrated system and the first un-calibrated system. In the case where the second un-calibrated system is another serving transmitter (the terminal having moved so that the first transmitter is no longer the serving transmitter) it is possible to use the new server's TA or RTTT value without knowing the terminal's position provided that the transmission time offset between the two transmitters is known, or is able to be determined. This may be the case, for example, where a previous calculation, made in accordance with the invention, has yielded a list of transmission time offsets within the terminal which contains entries for both transmitters.

One or both of the first or second un-calibrated stable systems could be a clock running inside the mobile terminal, or elsewhere, which is used to hold the calibrated time for a short period. In this case, the stability of the clock must be sufficient that the error introduced during the holding period is small enough not to matter. The second terminal position could also be the same as the first terminal position in this case.

As mentioned above, the calibrated system may be a satellite positioning system, and the or each un-calibrated stable system may be one or more transmitters of a communications network. The invention therefore includes this particular case, and especially the use of a 'synchronisation marker' for providing a calibrated time information mark from the signals of a communications network. This aspect of the invention uses the network-based positioning method described in our published international applications WO-A-00-73813 and WO-A-00-73814.

A method according to the first aspect of the invention, for use within a mobile terminal capable of receiving signals from transmission sources in a terrestrial network and from the satellites of a satellite positioning system having a time-base, wherein the calibrated time information is carried by a synchronisation marker, may further comprise the steps of at a preliminary terminal position, measuring the relative offsets in time, phase or frequency with respect to a first reference, of the signals received by the terminal from a plurality of the transmission sources in the terrestrial network;

at the first terminal position, measuring the relative offsets in time, phase or frequency with respect to a second reference, of the signals received by the terminal from the same transmission sources;

calculating the transmission time offsets, relative to a third reference, of the signals transmitted by the transmission sources and received by the terminal;

constructing a list of the relative transmission time offsets; calculating the first terminal position;

wherein the time offset is determined between the third reference and the time-base of the satellite positioning system; and at the second terminal position when satellite time-base time information is required to be determined, measuring the relative offsets in time, phase or frequency with respect to the third reference of the signals received by the terminal from at least three of said plurality of the transmission sources in the terrestrial network, determining the second position of the terminal, and creating the synchronisation marker with respect to the satellite positioning system time-base using one or more members of the list of transmission time offsets, said second terminal position, and said time offset between the third reference and the time-base of the satellite positioning system.

It is clear that a similar set of steps could be carried out for creating a synchronisation marker for use as the calibrated time information according to the second aspect of the invention.

Thus, a method according to the second aspect of the invention, for use within a mobile terminal capable of receiving signals from transmission sources in a terrestrial network and from the satellites of a satellite positioning system having a time-base, wherein the calibrated time information is carried by a synchronisation marker, may further comprise the steps of at a preliminary terminal position, measuring the relative offsets in time, phase or frequency with respect to a first reference, of the signals received by the terminal from a plurality of the transmission sources in the terrestrial network;

at the first terminal position, measuring the relative offsets in time, phase or frequency with respect to a second reference, of the signals received by the terminal from the same transmission sources;

calculating the transmission time offsets, relative to a third reference, of the signals transmitted by the transmission sources and received by the terminal;

constructing a list of the relative transmission time offsets; calculating the first terminal position;

wherein the time offset is determined between the third reference and the time-base of the satellite positioning system;

at the second terminal position, where the signals from the satellite positioning system are impaired or not available, measuring the relative offsets in time, phase or frequency with respect to a fourth reference, of the signals received by the terminal from at least one of the same and other transmission sources in the terrestrial network;

calculating the transmission time offsets, relative to a fifth reference, of the signals transmitted by the transmission sources and received by the terminal;

constructing a list of the relative transmission time offsets; calculating the second terminal position;

wherein the time offset is determined between the fifth reference and the third reference; and at the third terminal position when satellite time-base time information is required to be determined, measuring the relative offsets in time, phase or frequency with respect to the fifth reference of the signals received by the terminal from at least three of the transmission sources in the terrestrial network, determining the third position of the terminal, and creating the synchronisation marker with respect to the satellite positioning system time-base using one or more members of the list of transmission time offsets, said second terminal position, said third terminal position, said time offset between the fifth and third references, and said time offset between the third reference and the time-base of the satellite positioning system.

The first, second, third, fourth and fifth references or any combination of them may be the same reference in practice. A reference may be a signal received by a receiver, or another signal which may be locally generated, for example by a quartz oscillator. For example, the signals received by the terminal from the serving cell may be used as a reference, and the timings of the signals received from other cells measured with respect to it. Alternatively, an internal clock of adequate stability over a short period may be used as a reference.

The position determined at any of the terminal positions may also be provided to assist in acquiring the satellite signals.

The measurements of the relative offsets in time, phase or frequency with respect to any reference, of the signals received by the terminal from transmission sources in the terrestrial network may be solely of signals broadcast by the network, in other words there is no requirement for the terminal to send signals to the network. When the network of transmission sources is a communications network, there is no requirement for the terminal to be registered on the network.

The synchronisation marker may be implemented by any convenient means, for example it could be provided as an electrical signal or a clock offset message. It is understood that the synchronisation marker may be used to determine the placement of the search windows conventionally used in satellite positioning systems such as GPS.

The steps of measuring the relative offsets in time, phase or frequency, with respect to any of the references, of the signals received from the transmission sources may be achieved using signal patterns in each of the signals transmitted by the respective transmission sources. As explained in our WO 00/73813 and WO 00/73814, in the case when the transmission sources are members of a communications network, for example a GSM or WCDMA network, the signal patterns may be synchronisation bursts broadcast on a control channel, or they may be frame boundaries in the transmitted data streams.

The list of relative transmission time offsets is the list of transmission times of these signal patterns, measured relative to the third or fifth references. Implicit in the step of so constructing this list is the establishment of the third or fifth reference with respect to which each of the transmission time offsets is expressed. For example, the third reference could be the time at which a particular signal pattern is transmitted by a selected transmitter, or it could be constructed by taking the average of all the calculated transmission time offsets.

The measurements at the preliminary and first terminal positions are made at distinct first and second times in order to construct the relative transmission time offsets and position of the mobile terminal, but this function is not limited to the use of only two sets of measurements, and more than two may be used if desired. There is often an advantage, in practice, of averaging the measurements in order to reduce the effects of noise or multi-path propagation.

Measurements used to link the satellite time-base to the timing of the network signals are made at a third time which is independent of the first and second measurement times. Since the measurements do not need to occur sequentially, the third time could be the same as the first or second times or before or after either or both of the first and second times. There is not a one-to-one correspondence between the third time and the first or second times and each may occur whenever required.

Measurement of the time offset of the time base of the satellite positioning system with respect to one or more members of the list of transmission time offsets may be achieved using time-markers in the signals received from the satellites whose time relationship with respect to the satellite time base is known or may be determined. The differences in times of arrival of said satellite signal time-markers and one or more of the signal patterns used to establish the network transmission time offsets may be measured, and these may be used to establish the time offset of the third reference of the list of transmission sources and the satellite time-base.

In order to improve the accuracy of the synchronisation marker, it is possible to measure the time offset between the satellite positioning system time-base and the third reference of the list of transmission time offsets at further third times and combine the measurements, for example by averaging.

It is explained in our earlier patent applications WO-A-00-73813 and WO-A-00-73814 how a list of transmission time offsets of signals transmitted by network transmitters can be computed from timing measurements of the respective signals received by the terminal. Furthermore, as described in WO-A-00-73814, these timing measurements may be obtained from a single terminal at different times as it moves around the network.

It will be clear from the foregoing discussion that the invention can be used to provide time transfer in a terminal without any interaction with a computing node based in the network. However, the computation required for the calculation of the transmission time offsets and the position, according to our applications WO-A-00-73813 and WO-A-00-73814, may be too great to be easily carried out within a terminal, and hence there may be advantage in using a network-based computing node for this purpose. A further advantage is that the accuracy of the calculation may be enhanced by the use of measurements made by other terminals in the network, which are not easily available to a terminal.

A method in which the mobile terminal is assisted by a server connected to the terminal via a communications link, the server carrying out the computations necessary for the extraction of the un-calibrated time information from the un-calibrated stable system, for use within a mobile terminal capable of receiving signals from transmission sources in a terrestrial network and from the satellites of a satellite positioning system having a time-base, wherein the calibrated time information is carried by a synchronisation marker, may further comprise the steps of at a first terminal position, measuring the relative offsets in time, phase or frequency, of the signals received by the terminal from a plurality of the transmission sources in the terrestrial network;

sending said measurements to a computing node;

calculating the first terminal position;

calculating the transmission time offsets, relative to a reference, of the signals transmitted by the transmission sources and received by the terminal;

adjusting the transmission time offsets for the transmission delays to the calculated first terminal position of the signals from the respective transmission sources;

constructing a first list of the adjusted relative transmission time offsets;

sending said first list of adjusted relative transmission time offsets to the terminal; wherein the time offset is determined between the reference and the time-base of the satellite positioning system;

at a second terminal position when satellite time-base time information is required to be determined, measuring the relative offsets in time, phase or frequency, of the signals received by the terminal from a plurality of the transmission sources in the terrestrial network;

sending said measurements to a computing node;

calculating the second terminal position;

calculating the transmission time offsets, relative to the reference, of the signals transmitted by the transmission sources and received by the terminal;

adjusting the transmission time offsets for the transmission delays of the signals from the respective transmission sources to the calculated second terminal position;

constructing a second list of the adjusted relative transmission time offsets;

sending said second list of adjusted relative transmission time offsets to the terminal; and creating the synchronisation marker with respect to the satellite positioning system time-base using one or more said members of each of said first and second lists of adjusted transmission time offsets, and said time offset between the reference and the time-base of the satellite positioning system.

This method may be further understood with reference FIG. 1 and the following discussion about what is measured by the terminal, and what information is sent between the terminal and the computing node in order to construct a synchronisation marker calibrated to the satellite time-base.

Figure 9:
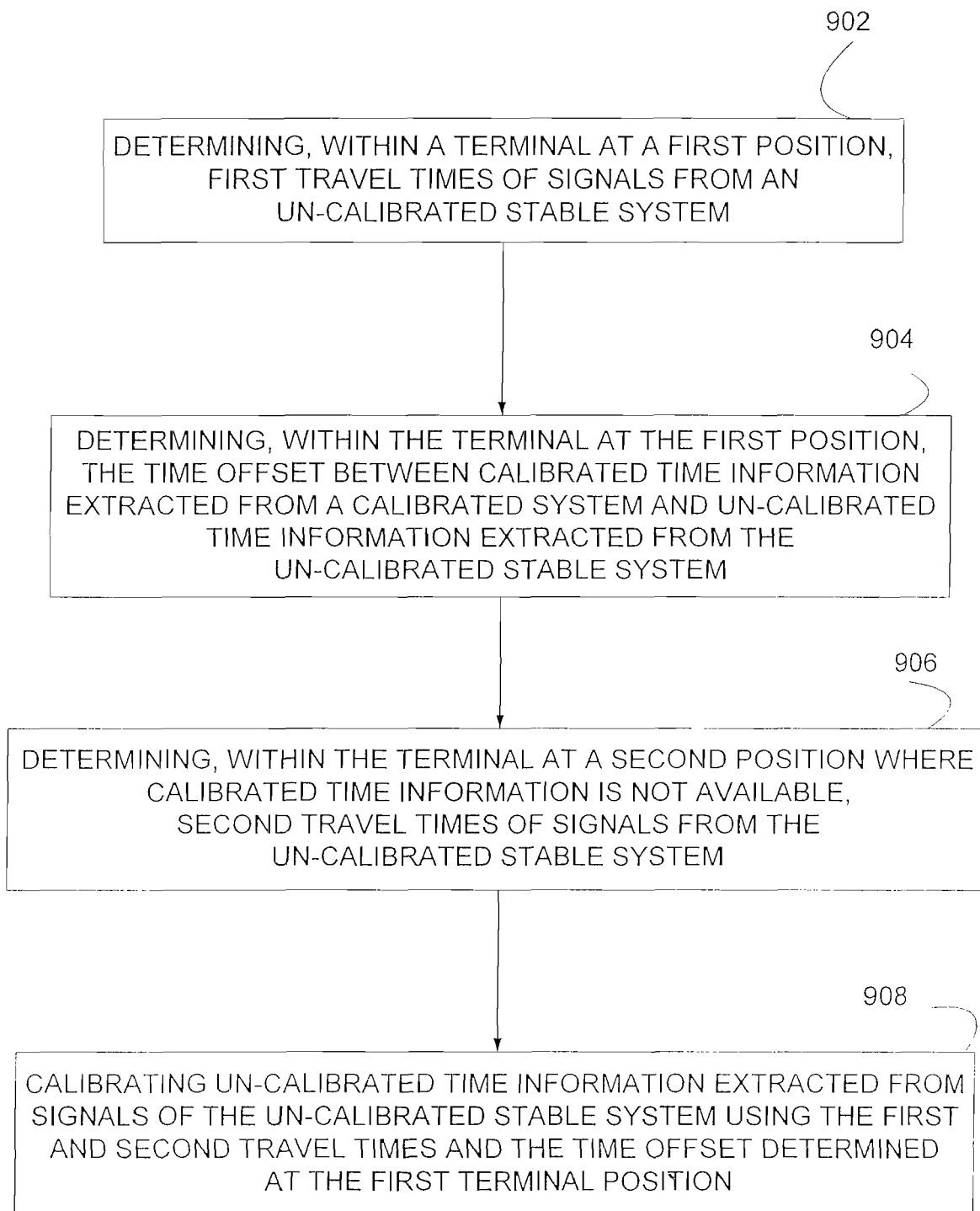
FIG. 9 is a flow chart showing the process used for calibrating un-calibrated time information within a mobile terminal having one or more receivers capable of receiving signals from which calibrated time information carried by a calibrated system can be extracted, and of receiving signals from which un-calibrated time information carried by an un-calibrated stable system may be extracted.

Referring to FIGS. 1 and 9, signals from transmitters 103 of network 107 are received by terminal 101 and the times of arrival of particular signatures in the signals are measured with respect to the terminal's clock (step 902). If $t_{A1}$ is the time of receipt of the signature in the signal from transmitter A (a specific one of the transmitters 103) when the terminal is at position 1, then $t_{A1}$ is given by $$vt_{A1} = r_{A1} + v\alpha_A + v\epsilon_1, \qquad (1)$$

where $\alpha_A$ is the transmission time offset of transmitter A and $\epsilon_1$ is the time offset of the terminal's clock when at position 1, all times expressed with respect to a universal clock, $r_{A1}$ is the distance between the terminal and the transmitter, and v is the speed of the radio waves in the medium in which the transmission takes place. Such measurements are also made on the signals received from transmitters B, C, D etc., and the whole set is sent from terminal 101 to a computing node in the network (not shown in FIG. 1). (It should be noted that the interval over which the measurements are made is very short, so that any deviation from uniform time-keeping of the clock in the terminal is negligible.)

The computing node carries out a calculation, as explained in our applications WO-A-00-73813 and WO-A-00-73814, which produces both the position of the terminal and the transmission time offsets, $\alpha_A$, $\alpha_B$, $\alpha_C$, $\alpha_D$ etc., corresponding to the transmitters A, B, C, D etc. Since the position of the terminal is also calculated, and the positions of the transmitters A, B, C, D etc. are known, then the corresponding values of $r_{A1}$, $r_{B1}$, $r_{C1}$, $r_{D1}$ etc. can also be computed. The transmission time offsets can therefore be adjusted for the additional propagation times of the signals from the respective transmitter to the terminal. If the adjusted transmission time offsets are designated $\beta_{A1}$, $\beta_{B1}$, $\beta_{C1}$, $\beta_{D1}$ etc., then $\beta_{A1}$, for example, is given by $$\beta_{A1} = \alpha_A + (r_{A1}/v). \qquad (2)$$

The set of $\beta_S$ corresponding to the transmitters A, B, C, D etc., as received at terminal position 1, is sent from the computing node to the terminal. The terminal stores this set of $\beta_S$ in its internal memory. The difference between two values of $\beta$, say $\beta_{A1} - \beta^{B1}$, then represents the difference in time between the receipt by the terminal of corresponding signatures in the signals from transmitters A and B, at terminal position 1. (In practice, this difference may not be exactly the same as that measured by the terminal because of errors in the measurements and error-mitigation techniques (such as averaging) used within the computing node.)

Our applications WO-A-00/73813 and WO-A-00/73814 also disclose how corrections can be made for terrestrial transmitters with frequency differences such that the time signatures of each drift with respect to the others. These corrections may be applied to the values of $\beta$ accordingly. In addition, the referenced applications show how further corrections may be applied to the observed times of arrival of the terrestrial transmitter signatures to compensate for motion of the mobile terminal.

As explained above, and in accordance with the invention, the terminal also measures satellite positioning signals at position 1 from which the satellite time-base is extracted (step 904). In essence, a clock signal is produced by the satellite receiver in the terminal which is indicative of satellite time. This clock signal is compared with the arrival of the signature in the signal received from one of the transmitters 103, say transmitter A, and the time offset, $\Delta t_{A1}$, between the tick of the satellite clock and the arrival of the signature is measured. If $t_s$ is the satellite time-base time of the tick of the satellite clock, then the arrival of the signature in the signal from transmitter A is at satellite time $$T_{A1} = t_s + \Delta t_{A1}. \qquad (3)$$

The stored list of $\beta_S$ can now be used to calibrate the times of arrival of the signatures received from the corresponding transmitters with respect to satellite time. For example, the signature in the signal from network transmitter B would arrive at satellite time $$T_{B1} = t_s + \Delta t_{A1} + \beta_{A1}\beta_{B1}. \qquad (4)$$

In this way, the terminal calibrates the signals from all the network transmitters received at position 1 with respect to satellite time.

The terminal now moves to another position, say position 2, at which it cannot receive the satellite signals (step 906), but where it can receive the signals from network transmitters P, Q, R, S etc., in addition to those from at least one member of the stored set of $\beta_S$, say transmitter B. The terminal makes measurements on the signals received from all of the network transmitters P, Q, R, S etc., and B, and the whole set is sent from terminal 101 to the computing node. As explained above, the computing node carries out a calculation which produces values for the transmission time offsets and the position of the terminal, from which the corresponding set of corrected transmission time offsets, $\beta_{P2}$, $\beta_{Q2}$, $\beta_{R2}$, $\beta_{S2}$ etc., $\beta_{B2}$ are extracted. These, or a subset, are sent from the computing node to the terminal, and stored as a second set in the terminal's internal memory.

The terminal can now calibrate the time of arrival of the signature in the signal from one of the network transmitters received at position 2, say transmitter P (step 908). The satellite time corresponding to this is given by $$T_{P2} = t_s + \Delta t_{A1} + \beta_{A1} - \beta_{B1} + \beta_{B2} - \beta_{P2}. \qquad (5)$$

Hence, a calibrated satellite time signal synchronisation marker may be derived from the signal received by the terminal at position 2 from network transmitter P, which may be provided to the satellite receiver in order to aid in its detection of satellite signals.

One of the assumptions underlying the method of the invention outlined above is that the relative transmission time offsets of the network transmitters do not change between the measurements made at position 1 and those made at position 2. Our applications WO-A-00-73813 and WO-A-00-73814 disclose how allowances may be made for drifting transmitters, and of course the values of $\beta$ could be adjusted accordingly.

Any of the methods of time information transfer within a mobile terminal disclosed above may be used to assist in finding the terminal's position. The invention therefore includes a method of determining the position of a mobile terminal of a satellite positioning system in which the satellite receiver is provided with calibrated time information and terminal position information in accordance with the invention, and the position of the terminal is determined using at least one of the satellite signals.

Such a method can be used to reduce the time required to compute the position of the terminal in the satellite positioning system.

The position may be determined using just the satellite signal measurements or it may be improved by combining the satellite and network signal measurements.

In the case when there are not enough satellite signals to obtain a full position and time solution, it may be possible to obtain the satellite time base from the network timings calibrated according to the method of the invention and hence reduce the number of satellite signals needed. For example, a three-dimensional position plus time solution requires measurements obtained from the signals of four satellites. If the time component is supplied by the synchronisation marker, then the three-dimensional position solution may be obtained using only three satellite signals. Thus the invention also includes calculating a position using the synchronisation marker in place of the signals from a satellite.

The invention provides a hybrid architecture that combines a satellite positioning system and a system using signals from a network of terrestrial communications transmitters. Measurements of the signals from the terrestrial radio network can be used to generate and maintain a list of the timing relationships between them, and this list, in turn, is linked to the time-base of the satellite positioning system.

The satellite positioning system may be GPS, Galileo or any other. The network of terrestrial transmitters may be a cellular mobile telephone network based on GSM, WCDMA or other cellular system, or it may be a transmitter network used for radio or TV broadcasting, or a different terrestrial radio network.

The position generated typically follows a process. A low accuracy cell level position is available immediately, followed by the network derived position, and a little later the satellite derived position.

In the event that a position using the satellite system cannot be computed, even with assistance, the invention is still able to provide a position based on the terrestrial network timing measurements. This provides a more robust system which avoids complete location failure in comparison with unassisted satellite positioning.

In the event that it is not possible to generate assistance data from the terrestrial network signals, a satellite position may still be available.

The autonomous provision of time aiding and position aiding may benefit in ways other than improved accuracy, such as faster time to first fix resulting from the maintenance of the list of transmission time offsets, longer battery life or lower communications usage. It also allows the use of less-complex silicon chips for the satellite positioning system since fewer correlators are needed.

The relationship of the satellite time-base to the radio network may be established initially by performing an autonomous or partially-aided position fix. Any further satellite position fixes, even if aided, can be used to maintain the timing relationship between the satellite and terrestrial radio networks.

Positions and identities of the terrestrial network transmitters may be obtained from a database server. In the case where the computations are all made in the terminal, without the assistance of a network-based computation node (server), the network transmitter information may be broadcast by the communications network, or they may be obtained from an off-line source such as CDROM, flash memory device or manual entry. This information is relatively static and requires only infrequent updates.

The invention is particularly suited to tracking moving terminals where the use of both satellite positioning and terrestrial OTDA positioning will enable continuous and seamless tracking of terminals outdoors and indoors across multiple environments.

Preferably the mobile terminal into which the invention is incorporated contains a mobile cellular receiver operating on the GSM or WCDMA networks and a GPS receiver.

The invention also includes a medium carrying a set of instructions which, when loaded into a terminal containing satellite positioning system components, enables the terminal to carry out the method of the invention.

The invention also includes a mobile terminal of a satellite positioning system, the terminal including
  means for determining the travel times of the signals from an un-calibrated stable system to the terminal;
  time offset determination means for determining the time offset between calibrated time information extracted from the satellite positioning system and un-calibrated time information extracted from the un-calibrated stable system at a first terminal position where the signals from the un-calibrated stable system are available, and the signals from the satellite positioning system are available; and
  calibration means for calibrating un-calibrated time information, extracted from signals of the un-calibrated stable system received at a second terminal position, from the travel times of the signals from the un-calibrated stable system determined at the first and second terminal position and said time offset determined at the first terminal position.

The invention also includes a mobile terminal of a satellite positioning system, the terminal including
  means for determining the travel times of the signals from un-calibrated stable systems to the terminal;
  time offset determination means for determining, at a first terminal position where the signals from the first un-calibrated stable system are available and the signals from the satellite positioning system are available, the time offset between calibrated time information extracted from the satellite positioning system and un-calibrated time information extracted from a first un-calibrated stable system; and
  time offset determination means for determining, at a second terminal position where the signals from the first and second un-calibrated stable systems are available, a second time offset between un-calibrated time information extracted from the first un-calibrated stable system and un-calibrated time information extracted from the second un-calibrated stable system; and
  calibration means for calibrating un-calibrated time information, extracted from signals of the second un-calibrated stable system received at a third terminal position, from travel times of the signals from the un-calibrated stable systems received at the first, second and third terminal positions, and said first and second determined time offsets.

DETAILED DESCRIPTION OF THE EXAMPLES

FIG. 1 shows an example of a system embodying the invention and, in particular, shows the overall architecture of a satellite positioning system. A terminal 101 receives the signals broadcast from satellites 102 of the GPS system 100. It also receives the signals broadcast by the base transceiver stations (BTSs) 103 of a terrestrial network 107, in this case a GSM network.

Figure 2:
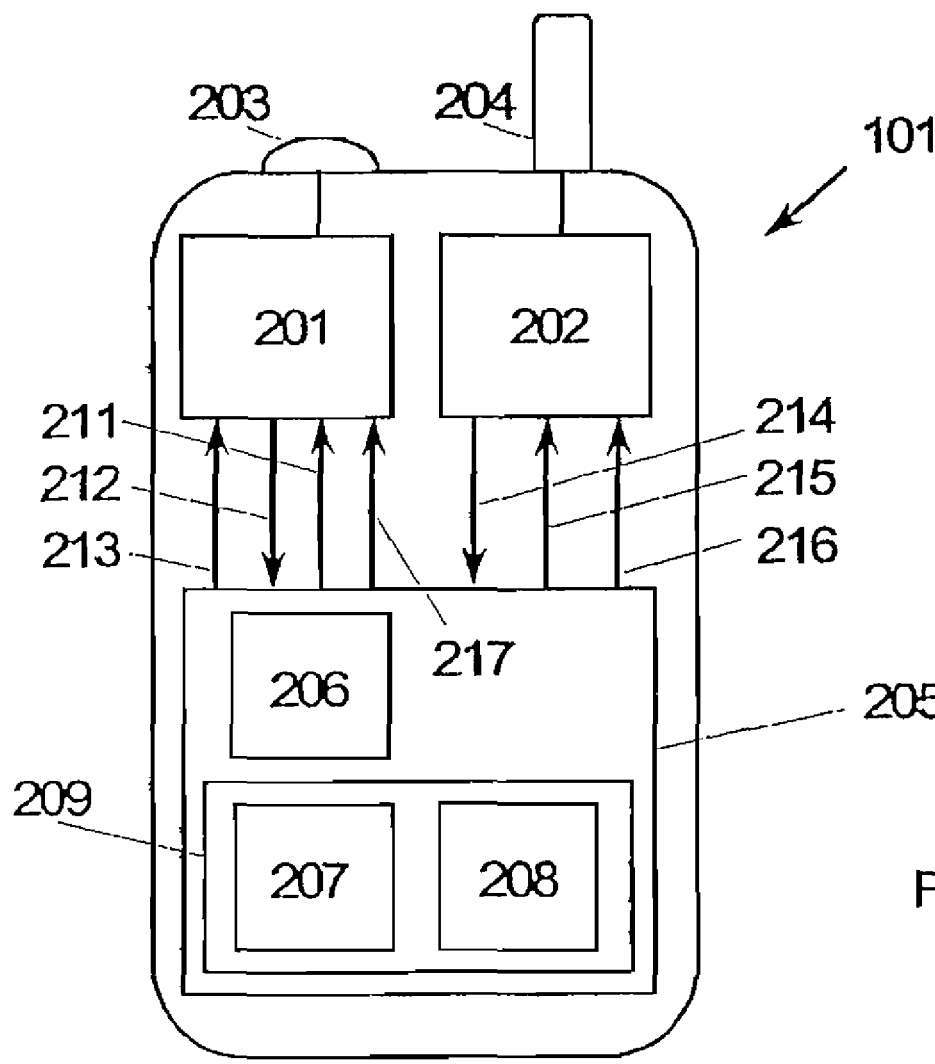
FIG. 2 is a diagram illustrating the main functional components of, and the signalling and data flows in, a first mobile terminal for use in a system of the invention.

FIG. 2 shows the main functional components of a mobile terminal 101 used in the system shown in FIG. 1. The terminal 101 includes a GPS module 201 containing a receiver for receiving signals from satellites of the GPS system 100 via patch antenna 203, a GSM module 202 containing a receiver for receiving the signals from the GSM radio network 107 via antenna 204, a general-purpose processor 205 including the memory, processing circuitry, and software program (not shown) usually associated with such a device within a mobile terminal, an oscillator circuit 206 which provides the clock signals for the terminal 101, and a software program 209 running on the general purpose processor. This program 209 and the general purpose processor 205 constitute a computing node. A locator module 207, and a network timing list 208, are part of the software program 209.

Figure 3:
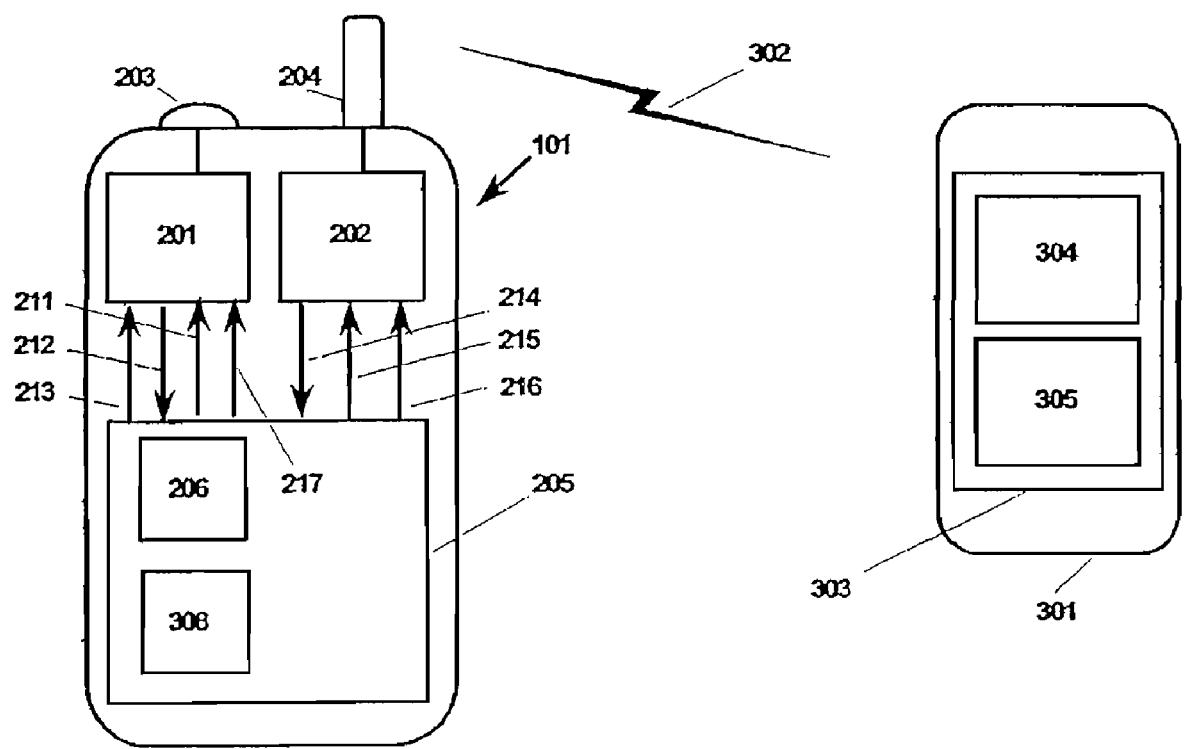
FIG. 3 is a diagram illustrating the main functional components of, and the signalling and data flows in and from, a further mobile terminal for use in a system of the invention.

FIG. 3 shows similar functional components in another terminal 101. The computing node resides in this case in a server 301 connected to the network 107. The terminal 101 communicates with the server 301 via a communications link 302 which is a part of the normal communications of a GSM network. The server 301 contains a processor 303 running software modules including the locator module 304 and the network timing list 305.

The either FIG. 2 or FIG. 3, the GSM module 202 also includes a user interface (not shown) which has the capability to input and output information to and from the terminal, and a signal processor (not shown) which is a standard feature of any GSM terminal and which provides the functionality to make network measurements such as observed time difference of arrival (OTDA), received signal strengths, transmitter identification, and other timing measurements of the signals received from the BTSs 103 by the GSM module 202, as described in WO 99/21028, the entire disclosure of which is hereby incorporated by reference.

In the terminal shown in FIG. 2, these measurements are passed 214 to the general-purpose processor 205 which computes in software module 207 a list of transmission time offsets (TTOs—the values of $\alpha$ in equation 1 above) from the measured observed time differences of arrival of the signals broadcast by the BTSs 103 of the GSM network 107 using the method described in our WO-A-00/73814. The calculation also requires the geographical positions of the BTSs 103 to be known, and these are obtained from a database as described in WO-A-00/73814. These values of $\alpha$ are stored in the network timing list 209.

In the terminal shown in FIG. 3, the values of OTDA are passed via the communications link 302 to the server 301. The computations are then carried out within the locator module 304 and the values of $\alpha$ are stored in the network timing list 305. In this case, however, a further computation is carried out to convert the values of $\alpha$ to values of $\beta$ as shown in equation 2 above. These values of $\beta$ are then sent back to the terminal 101 via the communications link 302 where they are then stored within a network timing list mirror 308.

The GPS module 201 within the terminals 101 of either FIG. 2 or 3 receives and measures signals from the satellites 102 of the GPS system 100. It uses timing measurements of the signals from the satellite network 100 to compute the position of the terminal as described below.

FIG. 2 also shows further signalling and data flows within the terminal 101. Oscillator circuit 206 provides the clock timing signals for both GPS module 201 and GSM module 202. The signal of the serving cell of the GSM network received by module 202 is used to adjust the oscillator's frequency so that it conforms with the received GSM signal, i.e. a signal generated from the adjusted oscillator clock signal matches that of the received GSM signal. Clock signals generated from the oscillator 206 are provided 211 to the GPS module 201 and also provided 216 to the GSM module 202. The values of OTDA and other measurements made by the GSM module 202 are passed via link 214 to the general purpose processor 205. Data to be transmitted by the GSM module 202 to the GSM network 107 are passed from the general purpose processor 205 via link 215. A signal indicative of GPS time is passed via link 212 from the GPS module 201 to the general purpose processor 205. A synchronisation marker signal, generated in accordance with the invention, is passed via link 213 from the general purpose processor 205 to the GPS module 201.

The GPS timing signal 212 is used to establish, by means of software in the examples of either FIG. 2 or FIG. 3, the relationship of the time-base of the GPS system 100 with respect to one or more members of the list of transmission time offsets (values of $\alpha$) held in the network timing list 208, 308. This relationship is illustrated in Table 1 below. The table illustrates, for each of five BTSs 103 A-E (column 1) of GSM network 107, the transmission time offset (column 2) calculated, relative to a reference (the "third reference"), in the general-purpose processor 205 from the signals received by the GSM receiver in module 202. The times are expressed in microseconds, and are modulo 1 burst length (about 577 μs) expressed as plus/minus half a burst, since the manner of making the measurements was ambiguous to this extent. In this case the third reference was calculated as the transmission time offset of a member of the list (103 C). Column 3 is a list of the transmission time offsets relative to the GPS time base. In this particular example, the time offset between the third reference and the GPS time-base was 67413.88 μs as explained below.

TABLE 1

| BTS Identifier | TTO (μs) relative to the third reference | TTO (μs) relative to GPS timebase |
|---|---|---|
| 103 A | −22.6 | 67391.28 |
| 103 B | 219.7 | 67633.58 |
| 103 C | 0.0 | 67413.88 |
| 103 D | −184.8 | 67229.08 |
| 103 E | 89.5 | 67503.38 |

Figure 4:
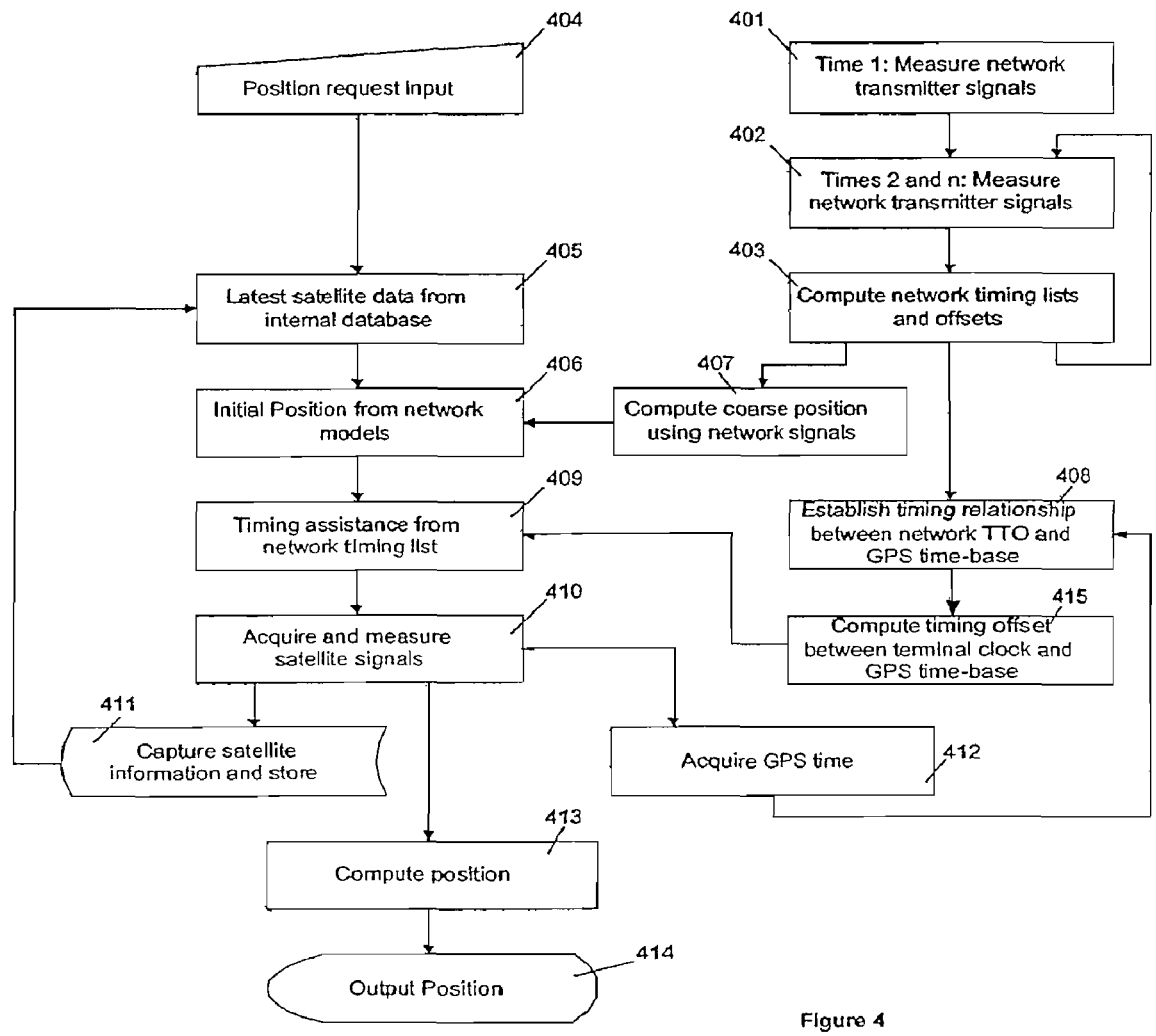
FIG. 4 is a flow chart showing the process used for computing positions in the system of FIG. 1 using the mobile terminal of FIG. 2.

A flow chart of the operation of the mobile terminal of FIG. 2 is illustrated in FIG. 4.

Some time after the terminal 101 is turned on a first set of measurements of the BTS signals is made in step 401 at the 'preliminary terminal position'. Some time later a second set of measurements of the BTS signals is made in step 402 at the 'first terminal position'. These two measurement sets are used to compute in step 403 a list of network transmission time offsets (the values of $\alpha$). Further measurements of the BTS signals are periodically made in step 402, and the list of transmission time offsets of the BTS signals is updated in step 403 after each set of measurements.

Separately, in step 410, the GPS receiver acquires and measures the signals from the satellites 102 and in step 412 a signal 212 representing the GPS time-base is generated. This signal is related, in step 408, to the third reference, relative to which the list of timing offsets generated in step 403 was established.

When a position request is made, step 404, (at a 'second terminal position') the latest set of satellite data is loaded in step 405 from a local satellite information database 411 maintained within the GPS module 201 as is conventional. A position, using the GSM network signals, is calculated in step 407 and is provided as an initial position to the GPS module 201 via link 217.

The synchronisation marker 213 is produced in step 409 in the general-purpose processor 205. The relationship, between the GPS time-base and the third reference, determined in step 408 is adjusted to take into account the position of the terminal (calculated in step 407) by allowing for the transmission delays of the signals from the BTSs 103 used to adjust the oscillator circuit 206.

Time assistance provided by the synchronisation marker 213, in step 409, is used to define signal search space for improved acquisition of the satellite signals by the GPS module 201.

The satellite signals are acquired and measured in step 410 aided by the satellite information generated in step 405, the initial position estimate generated in step 407 and time assistance (the synchronisation marker 213) generated in step 409.

Satellite information decoded from the received satellite signals is stored in the local satellite information database 411 for use in subsequent positioning attempts.

The position of the mobile receiver is computed in step 413, using the satellite signals acquired in step 410, and the position is output in step 414 to a requesting application, for example software running in the mobile terminal 101 or on an external server.

In use, the timing model of the BTS transmission time offsets is established as described above and the GPS time-base is measured in any GPS position fix, e.g. one made under "clear sky" conditions. The relationships between the GPS time-base and the terrestrial transmission time offsets are thus established and these are used to assist subsequent GPS position fixes under poorer conditions as described above.

The embodiment just described operates without the need for the terminal 101 to communicate with the GSM network 107. There is thus no requirement for the terminal to be registered on the network (which involves the terminal transmitting to the network), but only for it to be able to receive the signals broadcast by the BTSs.

As explained previously, the calculation of the list of transmission time offsets can also be made in a server connected to the terminal via a radio link. A further embodiment using the terminal of FIG. 3 is therefore now described in which the terminal 101 is used in a GSM network, and the calculations are carried out in a server 301 connected to the network. The communications between the terminal and the server are via the Short Message Service (SMS) in this case, although they could for example be via GPRS or any other convenient means.

Figure 5:
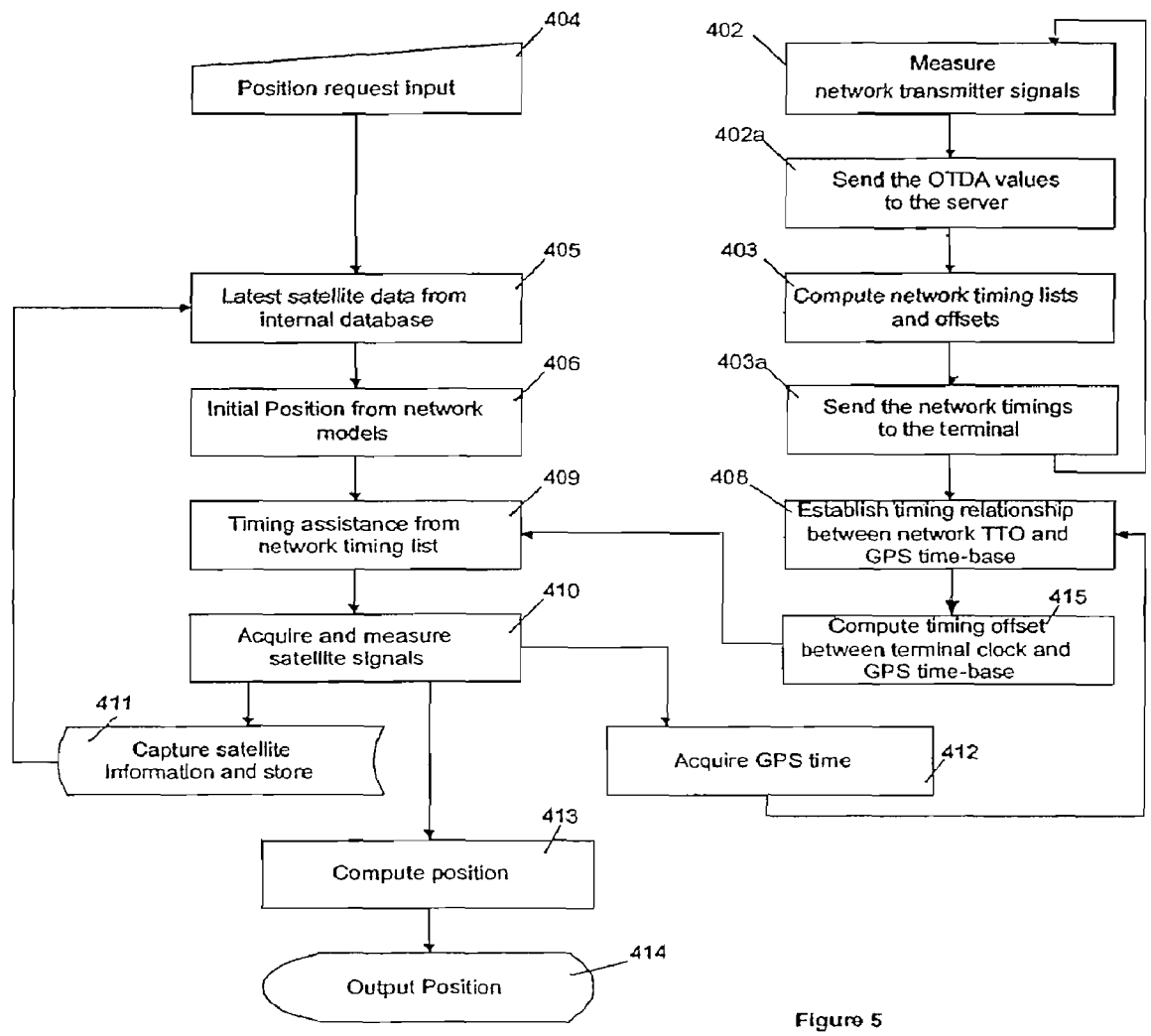
FIG. 5 is a flow chart showing the process used for computing positions in the system of FIG. 1 using the mobile terminal of FIG. 3.

FIG. 5 shows the flow diagram for this particular case. It is identical to that shown in FIG. 4, except for the deletion of steps 401 and 407, and the addition of steps 402a and 403a. In this case, the GSM network signal timing offsets are measured in step 402 and sent in step 402a to the network server 301 where the calculations are made in step 403. The list of values of β are then sent back to the terminal in step 403a.

Further embodiments are now described in which the invention is included in positioning systems in which terminals may communicate with other servers connected to the communications network.

Figure 6:
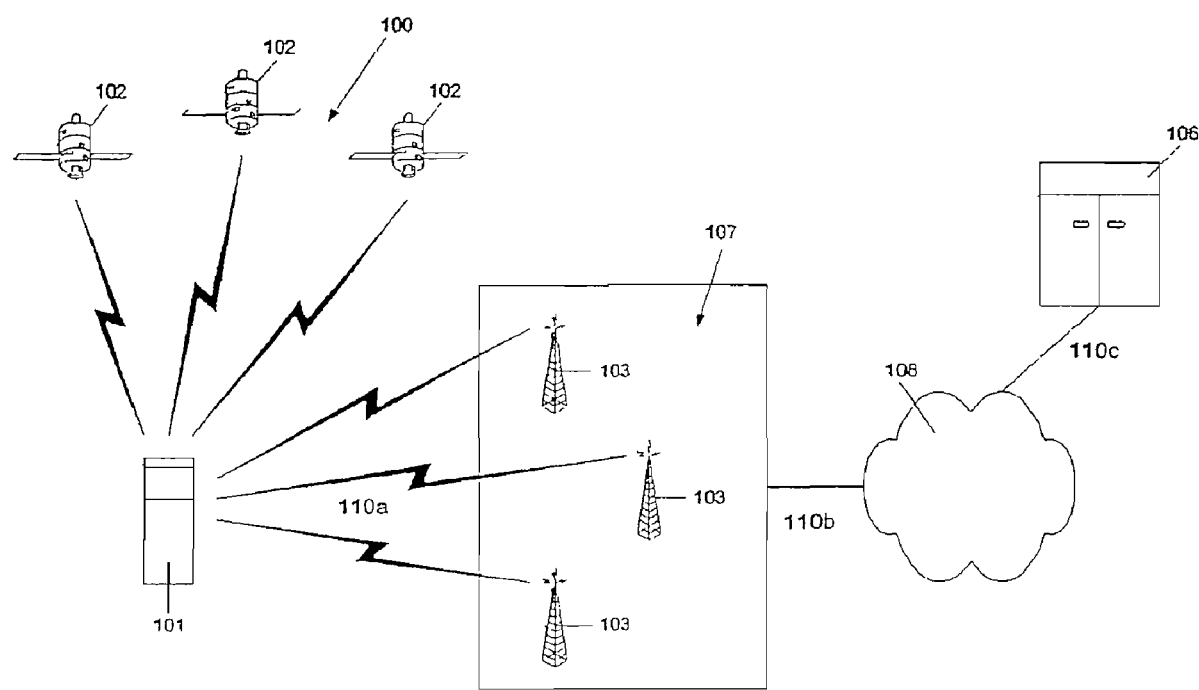
FIG. 6 is a diagram illustrating an alternative architecture in which the terminal communicates with a network application for exchanging position information.

One further example of a system which embodies the invention is illustrated in FIG. 6. In this example there are included communication links 110a-c between an external application server 106, connected via the Internet 108 and the GSM network 107, and the terminal 101. The communication link 110a between terminal 101 and the GSM network 107 is wireless. The communication link 110b between the network 107 and the Internet 108 is typically implemented as a cable connection. The communication link 110c connects the server 106 to the internet 108 and is again typically implemented as a cable connection.

In operation, an application resident on the server 106 requests the position of the terminal 101 which computes its position in the same way as described in the preceding examples. The resulting position is returned to the requesting application using the communication links 110a-c.

Figure 7:
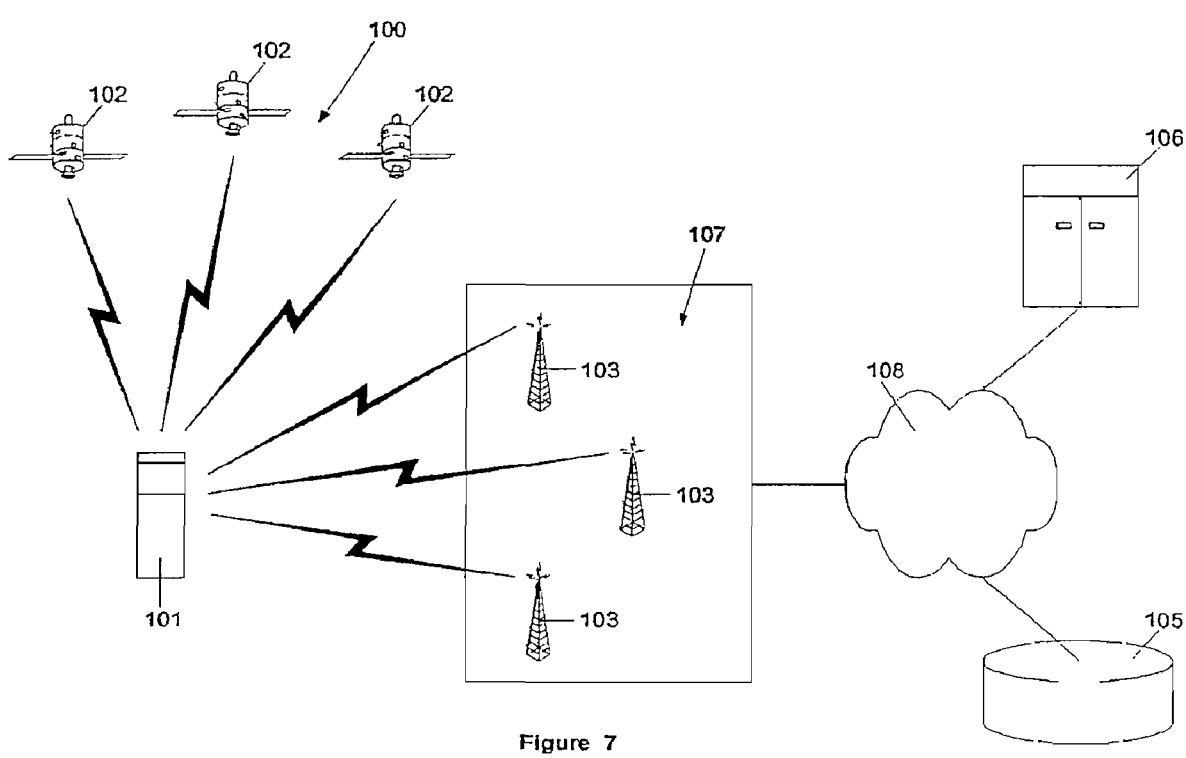
FIG. 7 is a diagram illustrating an alternative architecture in which the process may obtain some information about the network in which it is deployed from a server using a communications link.

Another arrangement which embodies the invention is illustrated in FIG. 7. In this case a further server 105, connected to the Internet 108 via a link 110d, contains static and semi-static configuration information such as satellite ephemeredes, clock correction information, and information about the GSM network 107, such as the geographic positions of the BTSs 103. This information is broadcast to the terminal 101.

In a further arrangement, similar to that described in the preceding paragraph (using the system of FIG. 7), the configuration information is retrieved on demand by the terminal 101 using communication links 110 as above. The information obtained from the server 105 is used to supplement the local satellite information database in the terminal 101, especially for the first operation of the terminal. The initial position estimate and the timing assistance are locally generated as in the first embodiment.

Figure 8:
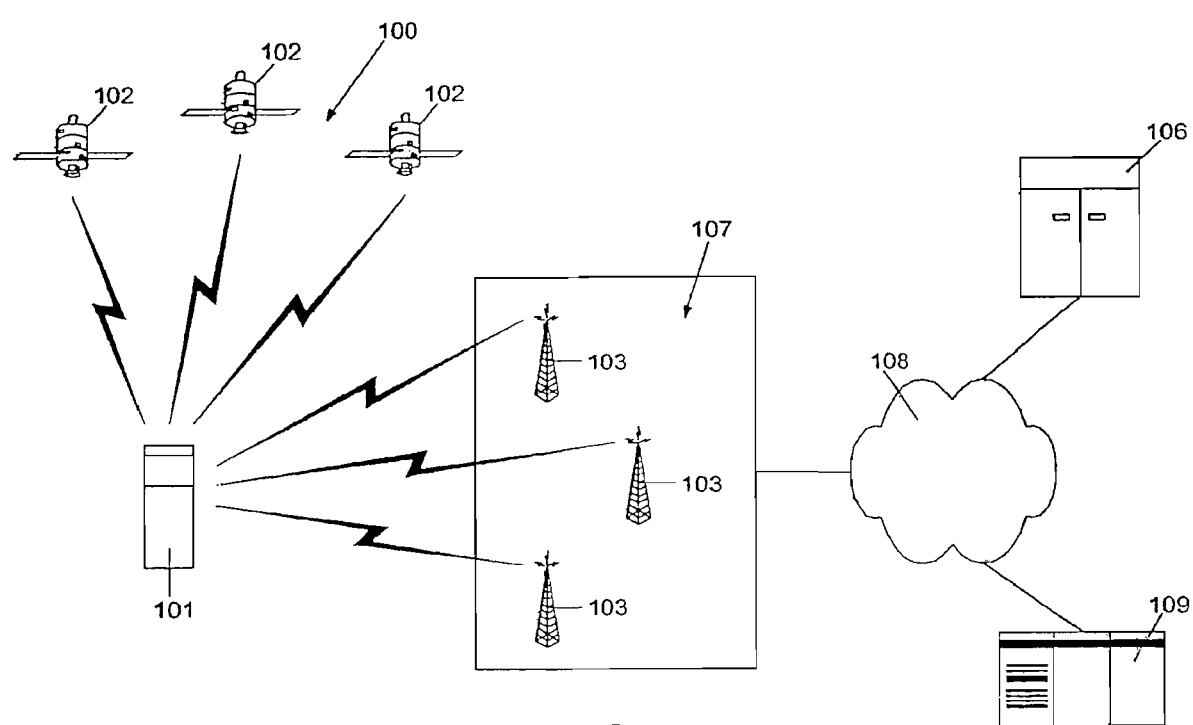
FIG. 8 is a diagram illustrating an alternative architecture in which the position computation may be carried out by a device external to the terminal and with which the terminal communicates.

Yet another embodiment is illustrated in FIG. 8. In this case the GPS position calculation function is separate from the terminal 101 which communicates with an external position calculation device 109 that is used to compute the position of the terminal. The GPS timing measurements provided to the position calculation device 109 are measured within the terminal 101.

It will be appreciated by those ordinarily skilled in the art that the invention applies equally and without limitation to satellite navigation systems other than GPS (e.g. Galileo, Beidou, Compass, QZSS, and Glonass). It will also be appreciated that the invention also applies equally and without limitation to communications systems other than GSM (e.g. CDMA, W-CDMA, TDMA, TDS-CDMA, PDC, IDen) and to other networks of terrestrial transmitters (e.g. public broadcast networks, digital radio and television, etc.).

What is claimed is:

1. A method of calibrating un-calibrated time information within a mobile terminal having one or more receivers, a first receiver capable of receiving signals from which calibrated time information carried by a calibrated system can be extracted, and the first or second receiver being capable of receiving signals from multiple transmitters of an un-calibrated stable communications system, said transmitters having offsets in their signal transmission times, from which signals un-calibrated time information carried by said un-calibrated stable communications system may be extracted together with the transmission time offsets, the method comprising:

determining said transmission time offsets using only the signals transmitted by the transmitters of the un-calibrated stable communication system and without requiring the mobile terminal to register on the un-calibrated stable communications system;

at a first terminal position where the signals from a first set of said transmitters of said un-calibrated stable communications system are available and the signals from the calibrated system are available, determining, within the terminal, first travel times of the signals from said first set of said transmitters and the transmission times offsets of said first set of said transmitters, and the time offset between said calibrated time information extracted from the calibrated system and said un-calibrated time information extracted from the un-calibrated stable communications system; and at a second terminal position, where calibrated time information is not available but where the signals from a second set of said transmitters and one of said first set of said transmitters of said un-calibrated stable communications system are available, determining, within the terminal, second travel times of the signals from the transmission time offsets of said second set of said transmitters and said one of said first set of said transmitters, and calibrating said un-calibrated time information, extracted from signals of the un-calibrated stable communications system using said first and second travel times, said transmission time offsets, and said time offset determined at the first terminal position.

2. A method of calibrating un-calibrated time information within a mobile terminal having one or more receivers, a first receiver capable of receiving signals from which calibrated time information carried by a calibrated system can be extracted, and the first or a second receiver being capable of receiving signals from multiple transmitters of each of first and second un-calibrated stable communications systems, said respective transmitters having offsets in their signal transmission times, from which signals un-calibrated time information carried by each of said first and second un-calibrated stable communications systems may be extracted together with the respective transmission time offsets, the method comprising:

determining said respective transmission time offsets using only the signals transmitted by the transmitters of the un-calibrated stable communication system and without requiring the mobile terminal to transmit signals to the un-calibrated stable communications system;

at a first terminal position where the signals from the transmitters of said first un-calibrated stable system are available and the signals from the calibrated system are available, determining, within the terminal, first travel times of the signals from the transmitters of said first un-calibrated stable communications system and a first time offset between said calibrated time information extracted from the calibrated system and said un-calibrated time information extracted from the first un-calibrated stable communications system;

at a second terminal position where the signals from the transmitters of said first and second un-calibrated stable communications systems are available, determining, within the terminal, second travel times of the signals from the transmitters of said first un-calibrated stable communications system, third travel times of the signals from the transmitters of said second un-calibrated stable communications system, and a second time offset between said un-calibrated time information extracted from the first un-calibrated stable communications system and said un-calibrated time information extracted from the second un-calibrated stable communications system; and at a third terminal position, where calibrated time information from the calibrated system is not available, determining, within the terminal, fourth travel times of the signals from the transmitters of said second un-calibrated stable communications system, and calibrating said un-calibrated time information, extracted from signals of the second un-calibrated stable system using said first, second, third and fourth travel times, said respective transmission time offsets, and said first and second determined time offsets.

3. A method according to claim 1, in which the positions of the transmitters of the un-calibrated stable communications system are decoded from signals received by the terminal from said transmitters.

4. A method according to claim 1, in which the position of the terminal is calculated using measurements of the signals received by the terminal from the transmitters of said un-calibrated stable communications system.

5. A system for calibrating un-calibrated time information within a mobile terminal having one or more receivers, a first receiver capable of receiving signals from which calibrated time information carried by a calibrated system can be extracted, and the first or a second receiver being capable of receiving signals from multiple transmitters of an un-calibrated stable communications system, said transmitters having offsets in their signal transmission times, from which signals un-calibrated time information carried by said un-calibrated stable communications system may be extracted together with said transmission time offsets, the system comprising means for determining said transmission time offsets using only the signals transmitted by the transmitters of the un-calibrated stable communication system and without requiring the mobile terminal to transmit signals to the un-calibrated stable communications system;

time offset determination means for determining the time offset between calibrated time information extracted from the calibrated system and un-calibrated time information extracted from the un-calibrated stable communications system at a first terminal position where the signals from a first set of said transmitters of said un-calibrated stable system are available, and the signals from the calibrated system are available;

means for determining the travel times of the signals from a first set of said transmitters of said un-calibrated stable communications system to the terminal at a first terminal position and the transmission times offsets of said first set of said transmitters and, at a second terminal position where calibrated time information is not available but where the signals from a second set of said transmitters and one of said first set of said transmitters of said un-calibrated stable communications system are available, the second travel times of the signals from the transmission time offsets of said second set of said transmitters and said one of said first set of said transmitters;

calibration means for calibrating un-calibrated time information, extracted from signals of the un-calibrated stable communications system, using travel times of the signals from the transmitters of said un-calibrated stable communications system determined at the first position and at the second terminal position, said transmission time offsets, and said time offset determined at the first position.

6. A system for calibrating un-calibrated time information within a mobile terminal having one or more receivers, a first receiver capable of receiving signals from which calibrated time information carried by a calibrated system can be extracted, and the first or a second receiver being capable of receiving signals from multiple transmitters of each of first and second un-calibrated stable communications systems, said respective transmitters having offsets in their signal transmission times, from which signals un-calibrated time information carried by each of said first and second un-calibrated stable communications systems may be extracted together with the respective transmission time offsets, the system comprising means for determining said respective transmission time offsets using only the signals transmitted by the transmitters of the un-calibrated stable communication system and without requiring the mobile terminal to transmit signals to the un-calibrated stable communications system;

means for determining the travel times of the signals from the transmitters of said un-calibrated stable communications systems to the terminal;

time offset determination means for determining a first time offset between calibrated time information extracted from the calibrated system and un-calibrated time information extracted from the first un-calibrated stable communications system at a first terminal position where the signals from the transmitters of said first un-calibrated stable communications system are available and the signals from the calibrated system are available;

time offset determination means for determining a second time offset between un-calibrated time information extracted from the first un-calibrated stable communications system and un-calibrated time information extracted from the second un-calibrated stable system at a second terminal position where the signals from the transmitters of said first and second un-calibrated stable communications systems are available; and calibration means for calibrating un-calibrated time information, extracted from signals of the second un-calibrated stable system, at a third terminal position, using the travel times of the signals from the transmitters of said un-calibrated stable communications systems received at the first, second and third terminal positions, said respective transmission time offsets, and said first and second determined time offsets.

7. A system according to claim 5, including a mobile terminal having one or more receivers capable of receiving signals from which calibrated time information carried by a calibrated system can be extracted, and capable of receiving signals from which un-calibrated time information carried by an un-calibrated stable communications system may be extracted.

8. A system according to claim 5, wherein the mobile terminal includes a first receiver capable of receiving signals from which calibrated time information carried by a calibrated system can be extracted and capable of receiving signals from which un-calibrated time information carried by an un-calibrated stable communications system can be extracted.

9. A system according to claim 5, wherein the mobile terminal further includes an additional receiver capable of receiving signals from which un-calibrated time information carried by a second un-calibrated stable communications system may be extracted.

10. A system according to claim 5, wherein the time offset determination means is disposed within a mobile terminal of a satellite positioning system.

11. A system according to claim 5, wherein the calibration means is disposed within a mobile terminal of a satellite positioning system.

12. A system according to claim 5, wherein the calibrated system comprises a clock disposed in the mobile terminal.

13. A system according to claim 5, wherein the calibrated system is one or more satellites of a satellite positioning system.

14. A system according to claim 12, in which the positions of the transmitters of the un-calibrated stable communications system are obtained from a database maintained within the mobile terminal.

15. A system according to claim 5, in which the positions of the transmitters of the un-calibrated stable communications system are decoded from signals received by the terminal from the un-calibrated stable communications system.

16. A system according to claim 12, in which the position of the terminal is calculated using measurements of the signals received by the terminal from the un-calibrated stable communications system.

17. A system according to claim 5, wherein the un-calibrated stable communications system comprises a clock running inside the mobile terminal.

18. A medium carrying a set of instructions which, when loaded into a mobile terminal containing satellite positioning system components, enables the terminal to carry out the method according to claim 1.

19. A mobile terminal of a satellite positioning system, the terminal including means for determining the travel times of the signals from transmitters of an un-calibrated stable communications system to the terminal, said transmitters having offsets in their signal transmission times;

means for determining said transmission time offsets using only the signals transmitted by the transmitters of the un-calibrated stable communication system and without requiring the mobile terminal to transmit signals to the un-calibrated stable communications system;

time offset determination means for determining the time offset between calibrated time information extracted from the satellite positioning system and un-calibrated time information extracted from the un-calibrated stable communications system at a first terminal position where the signals from the transmitters of said un-calibrated stable communications system are available, and the signals from the satellite positioning system are available; and calibration means for calibrating un-calibrated time information, extracted from signals of the un-calibrated stable communications system received at a second terminal position, from the travel times of the signals from the transmitters of said un-calibrated stable communications system determined at the first and second terminal positions, said transmission time offsets, and said time offset determined at the first terminal position.

20. A mobile terminal of a satellite positioning system, the terminal including means for determining the travel times of the signals from transmitters of first and second un-calibrated stable communications systems to the terminal, said transmitters of each of said un-calibrated stable communications systems having offsets in their signal transmission times;

means for determining said transmission time offsets using only the signals transmitted by the transmitters of the un-calibrated stable communication system and without requiring the mobile terminal to transmit signals to the un-calibrated stable communications system;

time offset determination means for determining, at a first terminal position where the signals from the first un-calibrated stable communications system are available and the signals from the satellite positioning system are available, the time offset between calibrated time information extracted from the satellite positioning system and un-calibrated time information extracted from the first un-calibrated stable communications system; and time offset determination means for determining, at a second terminal position where the signals from the first and second un-calibrated stable communications systems are available, a second time offset between un-calibrated time information extracted from the first un-calibrated stable communications system and un-calibrated time information extracted from the second un-calibrated stable communications system; and calibration means for calibrating un-calibrated time information, extracted from signals of the second un-calibrated stable communications system, received at a third terminal position, from the travel times of the signals from the un-calibrated stable communications systems received at the first, second and third terminal positions, said transmission time offsets, and said first and second determined time offsets.

21. A method according to claim 1, wherein the un-calibrated stable communications system comprises a clock running inside the mobile terminal.

22. A system according to claim 5, wherein the mobile terminal includes a first receiver capable of receiving signals from which calibrated time information carried by a calibrated system can be extracted and a second receiver capable of receiving signals from which un-calibrated time information carried by an un-calibrated stable communications system can be extracted.

* * * * *